Nov. 1, 1932.   E. L. FIX   1,885,245

APPARATUS FOR SEPARATING COMPOSITE GLASS PLATES

Filed Feb. 21, 1929

INVENTOR
Earl L. Fix
James L. Bradley

Patented Nov. 1, 1932

1,885,245

UNITED STATES PATENT OFFICE

EARL L. FIX, OF NEW KENSINGTON, PENNSYLVANIA, ASSIGNOR TO DUPLATE CORPORATION, A CORPORATION OF DELAWARE

APPARATUS FOR SEPARATING COMPOSITE GLASS PLATES

Application filed February 21, 1929. Serial No. 341,630.

Figure 1:
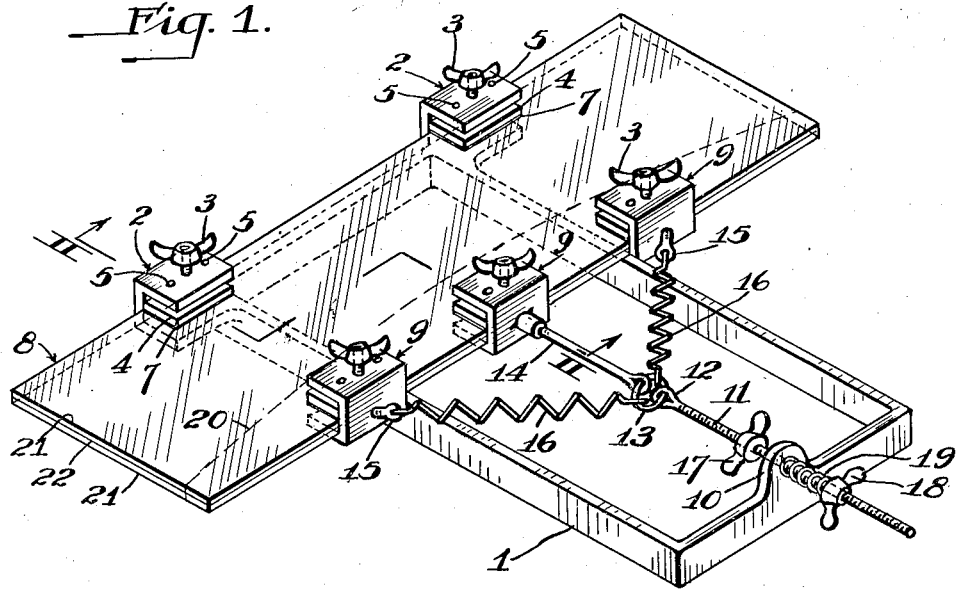
Figure 2:
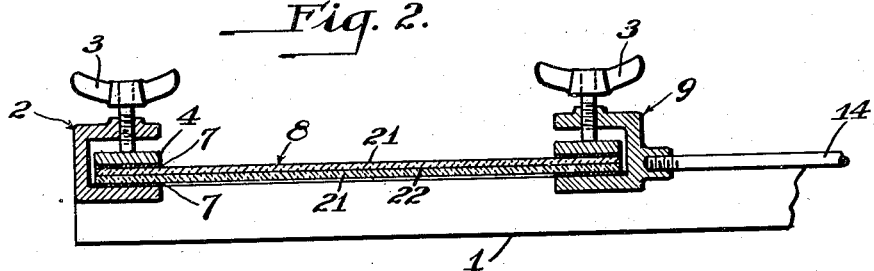
Figure 4:
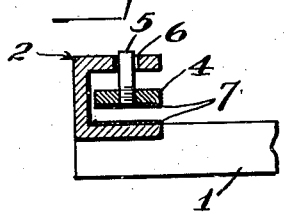
Figure 3:

The invention relates to apparatus for use in separating composite glass plates after the glass sheets have been cracked and the pyralin plastic sheet has been heated to permit it to stretch. This stretching is for the purpose of separating the edges of one of the glass sheets at the crack sufficiently to permit the insertion of a thin cutting tool, such as a razor blade, which is inserted in the crack so that its edge engages the plastic and is then drawn lengthwise of such crack. The object of the present invention is to provide simple, convenient means for accomplishing the stretching action positively and without injury to the glass. Certain embodiments of the invention are shown in the accompanying drawing, wherein:

Figure 1 is a perspective view of one form of apparatus as applied to a composite glass plate. Fig. 2 is a section on the line II—II of Fig. 1. Fig. 3 is a section through the composite plate after the device has operated to partially separate the two sections of the plate. And Fig. 4 is an enlarged section through one of the clamping members.

Referring to the drawing, 1 is a rectangular frame of metal carrying at one end the U-shaped clamping members 2, 2 provided with the thumb screws 3, 3 which engage the clamping plates 4, 4 at their lower ends. These plates are each provided with a pair of guide pins 5, 5 slidably engaging the holes 6, 6 (Fig. 4) in the members 2, 2. The lower faces of the plates 4, 4 and the opposing faces of the members 2, 2 are provided with cushioning strips 7, 7 of rubber or felt to avoid scratching the glass.

The clamping members 2, 2 are adapted to engage one edge of the composite plate 8, while the other edge is engaged by the clamping members 9, 9, 9, similar to the members 2, 2 and similarly equipped with thumb screws, clamping plates and guide pins. A bracket 10 is provided on the end of the frame 1, and through this bracket a threaded rod 11 slidably extends, being provided at its inner end with an eye 12 in which is mounted a ring 13. The central clamping member 9 is provided with a rod 14 having an eye through which the ring 13 extends, while the side clamping members 9, 9, are provided with eye bolts 15, 15 secured to the ring 13 by the coil springs 16, 16. The rod 11 is provided with a stop nut 17 and an adjusting nut 18, a spring 19 being interposed between the bracket 10 and the adjusting nut.

The apparatus, as described and illustrated, is designed to separate the composite plate 8 along the curved line 20 (Fig. 1). The plate 8 comprises a pair of glass sheets 21, 21 (Fig. 3) cemented or otherwise secured to the central sheet of tough material 22, such as pyralin or celluloid.

The operation is as follows. The glass sheets 21 and 22 are first scored and cracked along the line of cut 20, this being accomplished by the use of a wheel or diamond in the usual way. The apparatus is then applied to the plate as indicated in Fig. 1, the thumb screws 3 being turned down so that the clamps grip the plate tightly. The nut 18 is then adjusted inward until the spring 19 is strongly compressed and the nut 17 is positioned so that its face is about one-eighth of an inch away from the face of the bracket. The plate 8 with the apparatus thus applied is placed in a bath of hot water. In a short time the water softens the sheet 22 to such an extent that the spring 19 (which applies its power, tending to move the clamps 33 away from the clamps 9, 9, 9) causes the sheet 22 to stretch opposite the line of cut 20, thus opening up the crack 23 (Fig. 3), such stretching movement being limited by the nut 17 whose face now engages the bracket 10. The plate with its stretching device is now removed from the heating bath and the sheet 22 is cut by inserting a knife through the crack 23. If desired, the use of the spring 19 and the stop nut 17 may be dispensed with, the nut 18 being in such case screwed in to secure the desired separation after the sheet 22 has been sufficiently softened by the bath.

The springs 16, 16 are relatively very stiff and act substantially as links having a slight amount of give, so that the pull applied by the rod 11 is transmitted to the side clamps 9, 9. The strain imposed on the edge strip of the plate being cut is thus more equally distributed, although the device may be operated satisfactorily using only the center one of the three clamps 9, 9, 9.

What I claim is:

1. Apparatus for separating a composite glass plate made up of a pair of glass sheets secured to the opposite sides of a sheet of tough material after the glass sheets have been cracked, comprising gripping devices faced with yielding anti-slip material adapted to be clamped to the opposite edges of said plate, and spreading means extending between said devices and adapted to apply stress tending to separate said devices and thus stretch the sheet of tough material, said spreading means including a spring and adjustable stop means for limiting the range of movement of the spreading means.

2. Apparatus for separating a composite glass plate formed of a pair of glass sheets secured to opposite sides of a sheet of tough material after the glass sheets have been cracked, comprising a plurality of stationary clamping devices, a plurality of oppositely disposed movable clamping devices, yieldable operating means directly connected to one of the movable devices, additional yieldable means connecting the other movable devices to the operating means, and means for limiting the degree of separating movement of the clamping devices.

In testimony whereof, I have hereunto subscribed my name this 8th day of February, 1929.

EARL L. FIX.